United States Patent [19]
Thomas

[11] 3,915,186
[45] Oct. 28, 1975

[54] COMBINED CONTROL VALVE

[75] Inventor: Alfred William Thomas, Saarbrucken, Germany

[73] Assignee: Deutsche Bendix, Saarbrucken, Germany

[22] Filed: May 24, 1974

[21] Appl. No.: 473,121

[30] Foreign Application Priority Data
June 22, 1973 Germany............................ 2331704

[52] U.S. Cl. ................... 137/101; 60/418; 137/117; 137/557
[51] Int. Cl.² ........................................ G05D 11/03
[58] Field of Search .............. 60/418; 137/101, 117

[56] References Cited
UNITED STATES PATENTS
| | | | |
|---|---|---|---|
| 3,142,962 | 8/1964 | Lohbauer | 60/418 |
| 3,160,167 | 12/1964 | Martin | 137/101 |

*Primary Examiner*—Robert G. Nilson
*Attorney, Agent, or Firm*—Ken C. Decker; William N. Antonis

[57] ABSTRACT

In a combined control valve for controlling a pressure medium flow delivered by a hydraulic pump to a pressure medium circuit with an open centre and to at least one pressure medium circuit with a closed centre, a housing having an inlet port connected to the hydraulic pump, a first outlet port connected to the pressure medium circuit having an open centre, a second outlet port connected to a hydraulic accumulator and to the pressure medium circuit having a closed centre, a third outlet port connected to a make up reservoir, and auxiliary valve controlling a passage between the inlet port and the third outlet port in dependance on the pressure in the second outlet port, passage means connecting the inlet port to the second outlet port via a one-way valve. A normally closed control valve is subjected on the one hand to the pressure in the inlet port and on the other hand to the pressure in a control chamber, said control valve opening on a predetermined difference between such two pressures.

11 Claims, 3 Drawing Figures

COMBINED CONTROL VALVE

The invention relates to a combined control valve, more particularly for motor vehicles, for controlling a pressure medium flow delivered by a hydraulic pump to a pressure medium circuit with an open centre, more particularly for a servo device for a steering transmission, and to at least one pressure medium circuit with a closed centre, more particularly for a brake system, comprising a housing having an inlet port connected to the hydraulic pump, a first outlet port extending to the pressure medium circuit having an open centre, a second outlet port extending to a hydraulic accumulator and to the pressure medium circuit having a closed centre, and a third outlet port extending to a make-up reservoir.

If, for instance, a servo steering pump is used to supply a boosting force not only to a motor vehicle servo steering system, but also to the brake system and/or the suspension or other systems. It is advisable to provide a pressure accumulator, at least for the brake system. If the servo steering pump or the engine driving the pump fail, the shock experienced by the driver of the vehicle when the boosting force for the steering system suddenly fails, itself represents a very considerable adverse factor. However, if at the same time the driver has no boosting force left available for braking, the combination of both events may place an excessive strain on him.

Various suggestions have been made as to how pressure accumulators for brake systems can be charged. For instance, in the random accumulation system an accumulator is so connected via a non-return valve to the pressure inlet side of a hydraulic booster that it is subjected to the particular pressure present in the system. If the pressure present in the system exceeds the charging pressure in the accumulator, the non-return valve is opened and accumulator pressure rises up to substantially the pressure in the system. The particular pressure in the system depends on the demands of the servo steering system and brake system. If these demands can be met with a low pressure in the system, as, for instance, during a trip along a motorway, when little presure is required for the steering, if any, and the brakes remain unused for relatively long periods, the pressure accumulator is gradually discharged through the imperfect valve seats. If then the pump fails there is very little boosting if any available for the brakes. However, since this event only occurs extremely rarely, the aforementioned system can be used with a very low factor of risk.

To obviate such factor of risk an energy reserve must be provided which under normal conditions is completely maintained and remains available. It is also advisable, and therefore already demanded by certain companies, that the driver should be warned if for some reason the reserve drops below the safety level.

It is also known a system in which a small proportion, namely about 5 % of the total quantity pumped is sent via a metering to a charging valve. The flow is sent to the storage reservoir when a predetermined charging pressure has been reached. This system obviates the aforementioned factor of risk, but has various disadvantages. The main operational disadvantage occurs as follows : if a motor vehicle has remained stationary for a relatively long period the accumulator is discharged. While the vehicle is being started the pump is loaded to recharge the accumulator. This will happen even during the firt slow rotations of the starter, since initially pump delivery is preferably sent to the charging valve. If the vehicle was parked cold, the extra pump loading can result in the starting being unable to bring the engine to a speed such as to reach the required starting conditions, more particularly as regards ignition and fuel supply. Another disadvantage is that the flow for the charging valve is branched off a flow which is itself controlled by the pump and therefore must be limited so as not to affect the steering characteristics of the vehicle. This limited flow in the first place produces a relatively long charging time, during which the pump is increasingly loaded, and secondly results in a loss of work which continues during the whole charging period.

Other steps to charge the pressure accumulator reliably are known and used. These steps require the use of an indpendent pump, driven by the internal combusion engine or an electric motor.

Both systems require devices which control the accumulator pressure and either allow the pump to run at the same time unloaded or switch off the electric motor when such presure has been reached. The disadvantages of these steps are mainly of an economic nature, but in some cases the aforementioned or similar disadvantages also occur.

It is an object of the invention to provide a combined flow regulating and accumulator changing valve which is suitable for a motor vehicle pump, more particularly for an engine-driven servo steering pump, such combination valve involving no extra starting difficulties for the internal combustion engine and charging a pressure accumulator so quickly that it is only necessary to place an extra loading on the pump for a brief period, the combination valve taking over the functions of particular elements which are normally disposed in the pump, so that such elements can be eliminated and the actual extra costs of the combination valve are very low.

This problem is solved in a valve of the kind specificed according to the invention by the combination of the following features :

first passage means connecting the inlet port to the first outlet port via normally opened throttling means;

second passage means connecting the inlet port to the second outlet port via a one-way valve;

third passage means connecting the inlet port to the third outlet port;

an auxiliary valve controlling said third passage means in dependence on the pressure in the second outlet port ;

an orifice permitting metered flow of fluid from said inlet port to a control chamber; and a normally closed control valve disposed in the second passage means and subjected on the one hand to the pressure in the inlet port and on the other hand to the pressure in the control chamber, said control valve opening on a predetermined difference between such two pressures.

To prevent an excess flow in the first outlet port, the control valve also controls the flow cross-section of the throttling means. The pressure value for control can be determined beforehand by adapting the prestressing and/or the spring constant of a valve spring.

The excess pressure valve conventionally used for the pump is advantageously combined in the combination valve by the feature that the control chamber is connected via a normally closed excess pressure valve to the third outlet port, said last-named valve opening when the pressure in the inlet port reaches a maximum permissible value.

Moreover, no pressure switch is required to monitor the accumulator pressure, due to the feature that associated with the auxiliary valve is a switch which indicates the closure or open position of the valve closure member by closing or opening a warning circuit.

A detailed description of an embodiment of the invention will now be given by way of example with reference to the accompanying drawings, in which.

Figure 1:
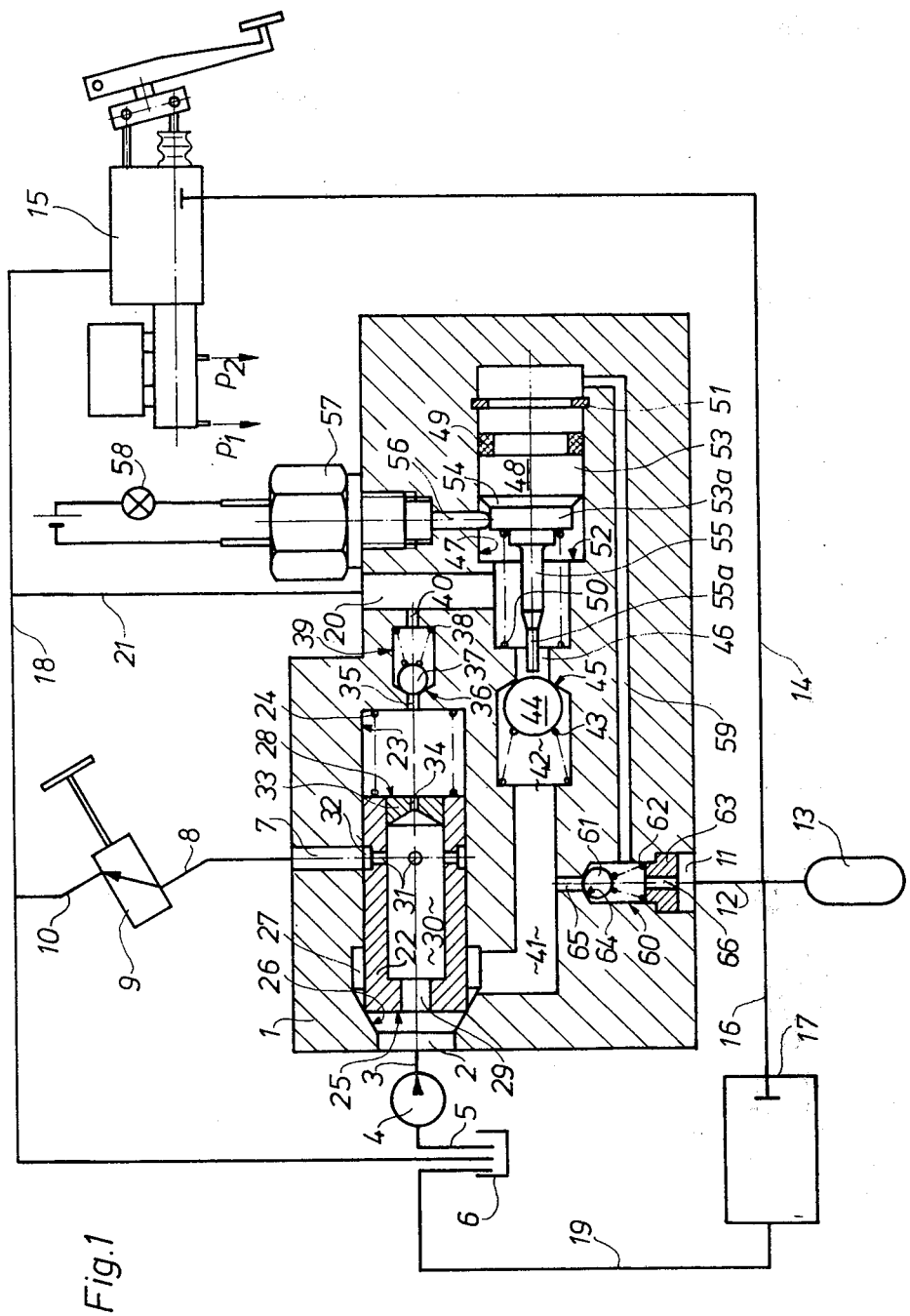
FIG. 1 shows partially sectioned a combination valve according to the invention incorporated in a motor vehicle pressure medium supply system.

The combination valve comprises a housing 1 having an inlet port 2 connected via a line 3 to the outlet port of a pump 4. The inlet or suction port of the pump 4 is connected via a line 5 to a liquid make-up reservoir 6 at atmospheric pressure. An outlet port 7 is connected via a line 8 to a servo steering system 9 whose outlet port is connected via a line 10 to the make-up reservoir 6. An outlet port 11 is connected via a line 12 to a hydraulic pressure accumulator 13. The line 12 is connected to a line 14 which extends to a hydraulic booster 15 and via a line 16 to other possible hydraulic devices 17.

The T symbol on the hydraulic booster 15 and the other devices 17 indicates that in their operative positions the apparatuses 15, 17 have no flow, whereas the arrow in the servo steering system 9 indicates that this device has a hydraulic flow in the central inoperative position. The outlet ports of the hydraulic booster 15 and of the other devices 17 are connected via lines 18, 19 to the make-up reservoir 6. An outlet port 20 of the control valve is connected via a line 21 to the make-up groove 6.

A piston 22 is slidably mounted in a bore 23 in the housing 1 and is so acted upon by a spring 24 that the end face 25 of the piston bears in sealing-tight relationship against a conical shoulder 26 of an annular chamber 27. The piston 22 is formed with a central passage 29 whose diameter and length are predetermined and which extends from the end face 25 to an inner chamber 30. The chamber 30 is connected via a plurality of radial bores 31 to an annular grove 32 of the piston 22. The annular grove 32 faces the outlet port 7 of the housing 1. At all times there is a direct connection between the inlet port 2 and the outlet port 7 for the servo steering system 9. The cross-sectional area of the chamber 30 and the sum of the cross-sections of the bores 31 are such that they are larger than the cross-sectional area of the passage 29. The chamber 30 is closed at the end face 28 of the piston 22 by a plug 33 formed with a small bore 34. The bore 23 is connected via a bore 35 to the valve seat 36 of a pressure-limiting valve 37. The pressure-limiting valve 37 is retained in the closure position by a spring 38 and disposed inside a bore 39 connected via a passage 40 to the outlet port 20.

The annular chamber 27 is connected via a duct 41 to a bore 42 containing a spring 43 retaining a valve ball 44 against a conical seat 45. The bore 42 is continued beyond the seat 45 by a bore 46 which widens out to a stepped bore 47. The piston 48 is sealed off from the stepped bore 47 by a sealing ring 49 and retained by a spring 50 against a circlip 51. The movement of the piston 48 to the left is limited by a shoulder 52 of the stepped bore 47. The piston 48 takes the form of a stepped piston. The major step 53 merges via a conical chamfer 54 into the step 53a of reduced diameter. The step 53a is continued and forms a third step 55 of reduced diameter which continues inside the bore 46 in the form of a needle 55a. An actuating tapped 56 of a switch 57 acts radially on the step 53a. As a result of the displacement of the piston 48 to the left, the raising of the actuating tappet 56 from the step 53a over the chamfer 54 to the step 53 closes (or opens) the switch 57 and delivers a signal taking the form of lamp 58. At the same time the valve ball 44 is lifted from the surface 45. The closed end of the stepped bore 47 is connected via a bore 59 to a chamber 60. The chamber 60 contains a non-retrun valve 61 on which a valve spring 62 acts. The valve spring 62 bears against a closure plug 63 of the chamber 60 and the non-return valve 61, so that the latter is retained against the valve seat 64. The valve seat 64 is connected via a bore 65 to the duct 41. The closure plug 63 is formed with a central bore 66 connecting the chamber 60 to the outlet port 11.

The installation described operates as follows:

when the pump 4 produces a flow of pressure medium depeding on the speed at which the pump rotates, the pressure medium passes through the passages 29, chamber 30 and bores 31 into the outlet port 7 from which it passes via line 8 to the servo steering system 9 and thence, with the opened centre via lines 10 and 18 to the storage reservoir 6.

At low pump speed, for instance when the motor is starting up, the volume of pressure medium delivered is small. The drop in the pressure through the passage 29 is inadequate to overcome the prestressing of the spring 24. The pressure acts over the whole end face 25 on the high pressure side and over the end face 28 on the low pressure side. During this time the end face 25 remains in contact with the conical shoulder 26, so that the full pump flow passes to the servo steering system 9 with the opened centre.

When the pump 4 rotates more quickly, for instance above the idling range of the motor, and the pump flow exceeds a predetermined value, typically 7–10 litres per minute, the drop in pressure through the passage 29 is enough to overcome the force exerted by the spring 24, and the piston 22 moves to the right. This movement enables the surplus part of the pump flow to flow via the annular chamber 27 to the duct 41.

If then the pressure accumulator 13 is already fully charged, the piston 48 has overcome the spring 50 and by its needle 55a lifted the valve ball 40 off its seat 45. Then the flow of pressure medium can flow via duct 41 and bore 42, 27, outlet port 20 and lines 21 and 18 to the storage reservoir 6. During this time the non-return valve 61 is closed under the pressure of the accumulator 13.

If the pressure accumulator 13 is not fully charged, the piston 48 is kept away from the ball 44 by the spring 50. The needle 55a then has no further contact with the valve ball 44, so that the latter bears against its seat 45 and blocks the flow. As a result there is no connection between the duct 41 and the make-up reservoir 6. The pressure then rises in the annular chamber 27, is propagated via the duct 41 and bore 65, overcomes the low force of the valve spring 62, flows through the chamber 60 and the bore 66 into the line 21 and charges the pressure accumulator 13.

This component flow charges the pressure accumulator 13 until the predetermined charging pressure has been reached. The rising charging pressure is propagated into the annular chamber 27 and acts on the end face 25 of the piston 22. The further displacement of the piston 22 to the right throttles the connection between the annular groove 32 and the outlet port 7, so that a rising charging pressure can build up at the inlet port 2 until finally the predetermined charging pressure has been reached. The charging pressure is propagated through the bore 59 to the closed end of the stepped bore 47. The predetermined charging pressure is such as to be adequate to overcome the prestressing of the spring 50 and move the piston 48 to the left. After a small movement the needle 55a touches the valve ball 44 and tends to lift it to the left from its seat 45. The valve ball 44 is loaded via its seat surface with the present pressure of the accumulator 13, so that some force is needed to lift the valve ball 44. The pressure in the accumulator 13 rises slightly, until it is adequate to continue to move the piston 48 to the left and lift the valve ball 44 against the force of the spring 50 and the force resulting from the charging pressure. As soon as the valve ball 44 has been lifted, a small connection is made to the make-up reservoir 6 via bores 46, 47, outlet port 20 and line 21. The pressure in the duct 41 drops, the non-return valve 61 recloses, and the pressure in the closed end of the stepped bore 47 is maintained. The resistance to the movement of the piston 48, i.e. the pressure exerted from the left on the valve ball 44 is reduced by the force resulting from the pressure in the bore 42, so that the piston 48 can continue to move and makes a connection of relatively large cross-section to the make-up reservoir 6. The pressure in the bore 42 finally drops so much that the piston 48 abuts the shoulder 52. The valve bore 46 is then completely opened and the duct 41 connected to the make-up reservoir 6 without a large drop in pressure. The required charging of the accumulator 13 is indicated by the warning lamp 58 lighting up (or extinguishing).

The pressure-limiting valve 36 comes into operation only if the pressure in the line 8, the chamber 30 and therefore the bore 23 rises due to the closure or partial closure of the flow in the servo steering system 9. After a predetermined pressure has been reached, the pressure-limiting valve 37 opens and opens up communication via bores 34, 35, 39 and 40, outlet port 20 and lines 21 and 18 to the make-up reservoir 6. When a predetermined drop in pressure via the bore 34 has been exceeded, the piston 22 moves to the right. As a result a subsidiary flow moves into the duct 41. If the pressure accumulator 13 is fully charged, the subsidiary flow passes via the opened bore 46 and outlet port 20 to the make-up reservoir 6. If the accumulator 13 is empty or not completely charged, the bore 46 is closed; then the accumulator 13 is charged via the non-return valve 61 and line 12, until the valve ball 44 is again lifted by the effect of the accumulator pressure.

The construction according to the invention combines the conventional flow regulating valve of the hydraulic pump with a flow regulating valve and the accumulator charging valve. The further inclusion of the conventional excess pressure valve is readily possible. Lastly, the invention provides a simple arrangement of a path-actuated indicator of the condition of the accumulator, so that there is no need for a pressure-actuated switch. Similarly, the control valve can be combined with a servo steering pump to produce one structural unit in a manner which saves space and expense.

Figure 2:
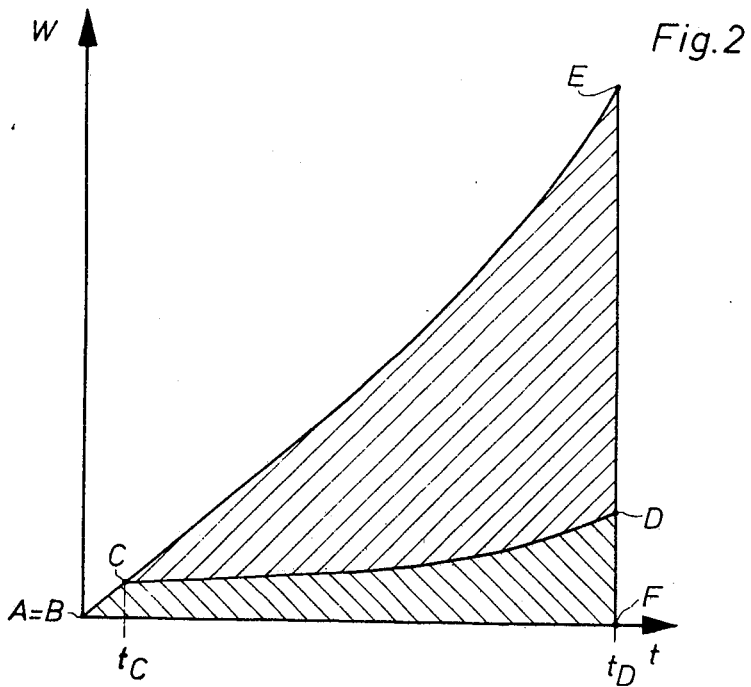
FIG. 2 is a diagram showing the charging conditioned total delivery in time of a servo steering pump with the use of a conventional regulating valve.
Figure 3:
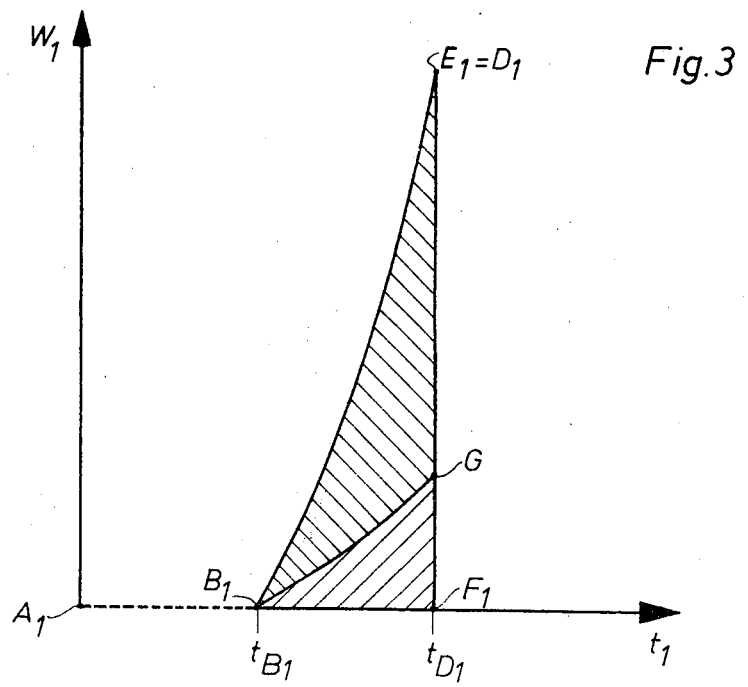
FIG. 3 is a diagram showing the charging conditioned total delivery in time of a servo steering pump with the use of a regulating valve according to the invention.

FIGS. 2 and 3 will be described in greater detail to make clearly the basic differences between a conventional control valve and that according to the invention.

FIGS. 2 and 3 show the distribution of the pump delivery W conditioned by the accumulator charging valve over time $t$, when the accumulator is empty and the motor driving the hydraulic pump is started.

Referring to FIG. 2, the starting point A of the motor coincides with the beginning B of accumulator charging. After the time $t_C$ has been reached, a division of the pump delivery takes place at the point C. Part is further used for charging the accumulator. After a pressure-conditioned rise, the accumulator is charged at the point D. The other part of the pump delivery represents a loss which results on the one hand from the flow through the servo steering system and on the other from the inner pump flow, when the pump has its own floor regulating valve. Point E denotes the highest value of pump delivery which is reached at a time $t_D$ when the accumulator is charged. After the time $t_D$ no further pump delivery is required for charging the accumulator and the curve drops from E and D to the point F. The area B, C, D represents the accumulator work, whilst the area C, E, D represents the loss work occuring during storage.

The time $t_C$ may be a fraction of a second, while $t_D$ is about 30 seconds. This shows that the accumulator pressure building up loads the pump and therefore the motor as early as the starting time (Point $A_1$). Some time is needed to charge the accumulator with a relatively small proportion of the total pump delivery (from Point C onwards). These conditions also exist during recharging, for instance after a relatively long trip along a motorway.

In FIG. 3 like elements to those in FIG. 2 have like references with an index 1. From the starting point $A_1$ onwards the pump runs simultaneously unloaded. After the idling speed and therefore a certain flow of pressure medium from the pump have been reached, at the time $t_{B1}$ the charging of the accumulator starts at the point $B_1$. The main part of the pump delivery is then used for charging which is completed at the time $t_{D1}$ and the point $D_1$. The point $D_1$ also corresponds to the highest value of the pump output and therefore coincides with $E_1$. During charging, a subsidiary flow loss has occurred which reaches its maximum value at point G. After the time $t_{D1}$ the curve of $E_1 = D_1$ and of g drops to the point $F_1$. The area $B_1$, $D_1$, G represents the accumulator work, while the area $B_1$, G, $F_1$ represents the loss work occurring during storage.

The time $t_{B1}$ represents the starting time and can be, for instance, a few seconds, while the charging time $t_{D1} - t_{B1}$ is, for instance, about 6 seconds. These times can be stated only by order of magnitude, since they depend on the particular starting conditions, speeds, etc. For instance, due to rise in speed after the starting operation of time $t_{D1} - t_{B1}$ can be reduced to, for instance, 1 second, more particularly if the accelerator pedal is briefly completely depressed, as is very often done. The rise in speed therefore directly benefits charging; this fact results in a brief time for recharging, for instance after a relatively long motorway trip, if the circuit with the open centre is always opened and the accumulator has emptied. Even if when starting, the driver should not actuate the accelerator pedal, the conventionally used choke ensures an increased idling speed, so that in the great majority of cases charging takes place very quickly.

I claim:

1. In a combined control valve for controlling a pressure medium flow delivered by a hydraulic pump to a pressure medium circuit with an open center, and to at least one pressure medium circuit with a closed center;

a housing having an inlet port connected to the hydraulic pump, a first outlet port connected to the pressure medium circuit having an open center, a second outlet port connected to a hydraulic accumulator and to the pressure medium circuit having a closed center, and a third outlet port connected to a make-up reservoir;

first passage means connecting the inlet port to the second outlet port via a one-way valve;

third passage means connecting the inlet port to the third outlet port;

an auxiliary valve controlling said third passage means in dependence on the pressure in the second outlet port;

a control chamber defined within said housing;

an orifice permitting metered flow of fluid from said inlet port to said control chamber; and control valve means disposed within said housing and responsive to the pressure differential between the inlet port and the control chamber to shift from an initial position preventing communication into said second and third passage means to an actuated position permitting communication from the inlet port into the second and third passage means when the fluid pressure differential between the inlet port and the control port exceeds a predetermined amount.

2. A combined control valve as set forth in claim 1, wherein the control chamber is connected via normally closed excess pressure valve to the third outlet port, said last named valve opening when the pressure in the inlet port reaches a maximum permissible value.

3. A combined control valve as set forth in claim 1, wherein the control valve also controls the flow cross-section of said throttling means.

4. A combined control valve as set forth in claim 1, wherein associated with the auxiliary valve is a switch which indicates the closure or open position of the valve closure member by closing or opening a warning circuit.

5. A combined control valve as set forth in claim 1, and resilient means acting on said control valve to establish the pressure differential required to shift said control valve to the second position.

6. A combined control valve as set forth in claim 1, said first passage means including a bore defined within said housing, said control valve means including a piston slidable in said bore and cooperating with the latter to define said control chamber between one end of said piston and the corresponding end of the bore, and an inlet chamber communicating with said inlet port defined between the opposite end of said piston and the opposite end of said bore, said control valve means and the wall of said bore carrying valve elements for controlling communication from said inlet port to said second and third passage means.

7. A combined control valve as set forth in claim 6, wherein said piston defines an inner chamber within the piston, a central passage communicating said inner chamber with said inlet chamber, and a radial passage extending through said piston and the wall of the bore to communicate said inner chamber with the first outlet port, said throttling means an annular groove on the surface of said piston intersecting said radial passages.

8. A combined control valve as set forth in claim 7 wherein said valve elements include a conical shoulder formed on the wall of said inlet chamber, an area on said piston adapted to engage said conical surface, and resilient means in said control chamber acting on said piston to urge the latter into sealing engagement with the conical shoulder.

9. In a combined control valve for controlling a pressure medium flow delivered by a hydraulic pump to a pressure medium circuit with an open centre, more particularly for a servo device for a steering transmission, and to at least one pressure medium circuit with a closed centre, more particularly for a brake system, a housing having an inlet port connected to the hydraulic pump, a first outlet port connected to the pressure medium circuit having an open centre, a second outlet port connected to a hydraulic accumulator and to the pressure medium circuit having a closed centre, and a third outlet port connected to a make-up reservoir, first passage means connecting the inlet port to the first outlet port, second passage means connecting the inlet port to the second outlet port via a one-way valve, third passage means connecting the inlet port to the third outlet port, an auxiliary valve controlling said third passage means in dependance on the pressure in the second outlet port, a bore in said first passage means, a piston slidably mounted in said bore and dividing the latter into a control chamber and an inlet chamber communicated to said inlet port, said piston including an inner chamber communicating with said inlet chamber via a central passage, and communicating with the first outlet port via radial passages and an annular groove which faces said first outlet port, spring means being prestressed in said control chamber to urge said piston in sealing-tight abutment against a conical shoulder formed in the inlet chamber, to normally close said second passage means, an orifice being formed in said piston to communicate said inner chamber and said control chamber.

10. A combined control valve as set forth in claim 9, wherein the control chamber is connected via a normally closed excess pressure valve to the third outlet port, said last named valve opening when the pressure in the inlet port reaches a maximum permissible value.

11. A combined control valve as set forth in claim 9, wherein a switch indicating the closure or open position of the valve closure member by closing or opening a warning circuit is associated with the auxiliary valve.

* * * * *